United States Patent [19]

Willis et al.

[11] Patent Number: 4,463,568
[45] Date of Patent: Aug. 7, 1984

[54] FUEL INJECTOR FOR GAS TURBINE ENGINES

[75] Inventors: Jeffrey D. Willis, Earnsford Grange; Arthur B. Griffin, Burbage; Bernard W. Boyce, Weddington, all of England

[73] Assignee: Rolls-Royce Limited, London, England

[21] Appl. No.: 400,224

[22] Filed: Jul. 20, 1982

[30] Foreign Application Priority Data

Jul. 28, 1981 [GB] United Kingdom ............... 8123208

[51] Int. Cl.³ ............................................. F02C 7/22
[52] U.S. Cl. ...................................... 60/742; 60/746; 239/424; 239/432
[58] Field of Search ............ 60/740, 742, 732, 39.463, 60/746; 239/404, 405, 423, 424, 424.5, 432

[56] References Cited

U.S. PATENT DOCUMENTS

| | | | |
|---|---|---|---|
| 3,483,699 | 12/1969 | Harvey | 60/737 |
| 3,483,701 | 12/1969 | Harvey et al. | 60/737 |
| 3,703,259 | 11/1972 | Sturgess et al. | 60/742 |
| 3,777,983 | 12/1973 | Hibbins | 60/742 |
| 3,961,475 | 6/1976 | Wood | 60/742 |
| 4,193,260 | 3/1980 | Carlisle et al. | |
| 4,327,547 | 5/1982 | Hughes et al. | 60/742 |
| 4,337,618 | 7/1982 | Hughes et al. | 60/742 |
| 4,342,198 | 8/1982 | Willis | 60/742 |

FOREIGN PATENT DOCUMENTS 2021204  11/1979  United Kingdom .

Primary Examiner—Carlton R. Croyle
Assistant Examiner—Jeffrey A. Simenauer

[57] ABSTRACT

A dual fuel injector for a gas turbine engine is arranged to maintain pre-determined air fuel ratios in adjacent upstream and downstream opposite handed vortices and to reduce the deposition of carbon on the injector. The injector comprises a central duct, a deflecting member, a first radially directed outlet, and a shroud which defines an annular duct, and a second radially directed outlet. The ducts receive a supply of compressed air and the central duct receives gaseous fuel from an annular nozzle and the annular duct receives liquid fuel from a set of nozzles.

When the injector is operating on liquid fuel, the fuel and air mixture issues from the second outlet and compressed air flows from the first outlet and prevents migration of fuel between the two vortices, thereby maintaining a rich air fuel ratio in the upstream vortex which reduces the emissions of NOx. Also, the flow of air from the first outlet reduces the deposition of carbon from the liquid fuels on the deflecting member.

2 Claims, 3 Drawing Figures

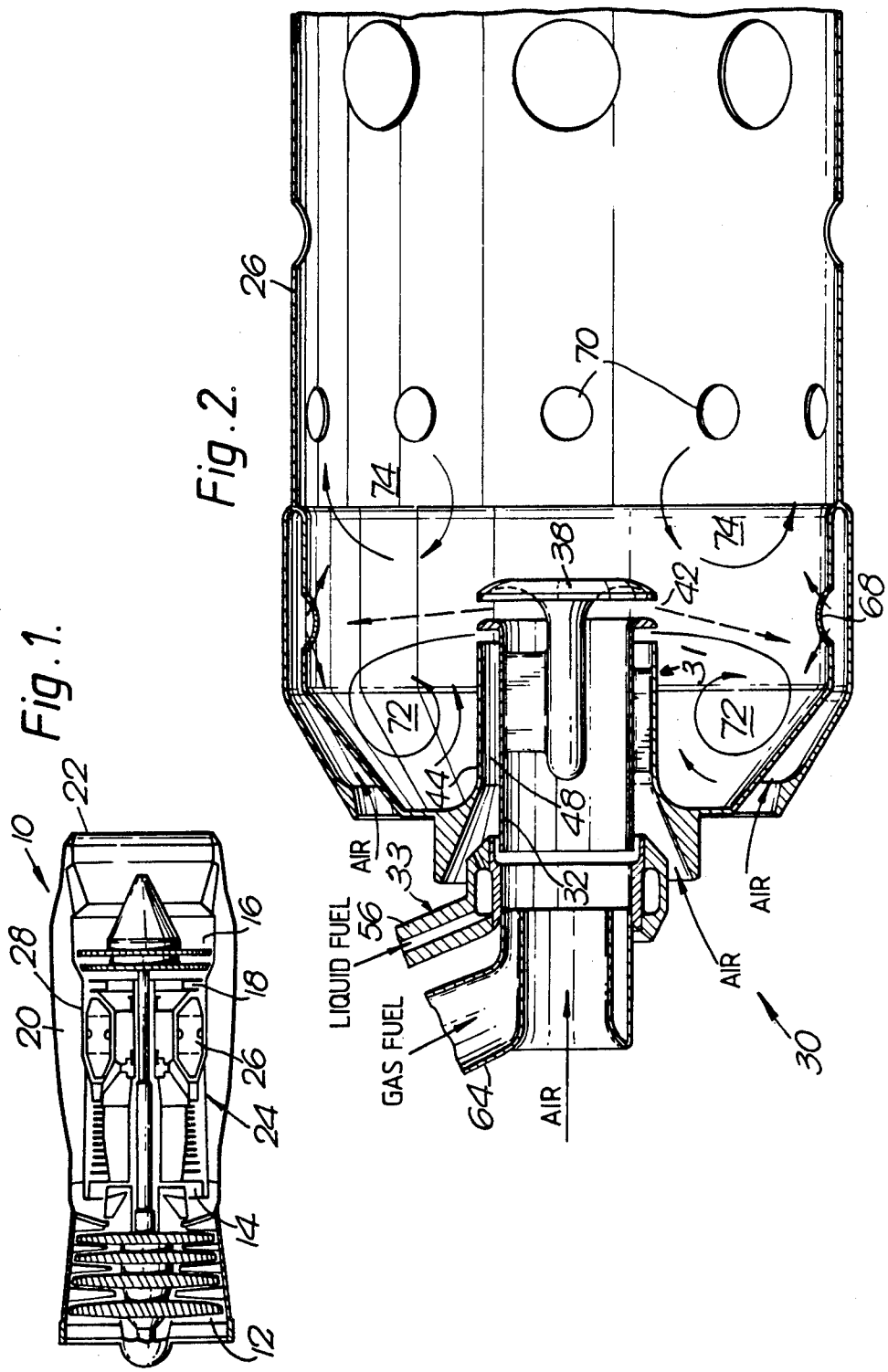

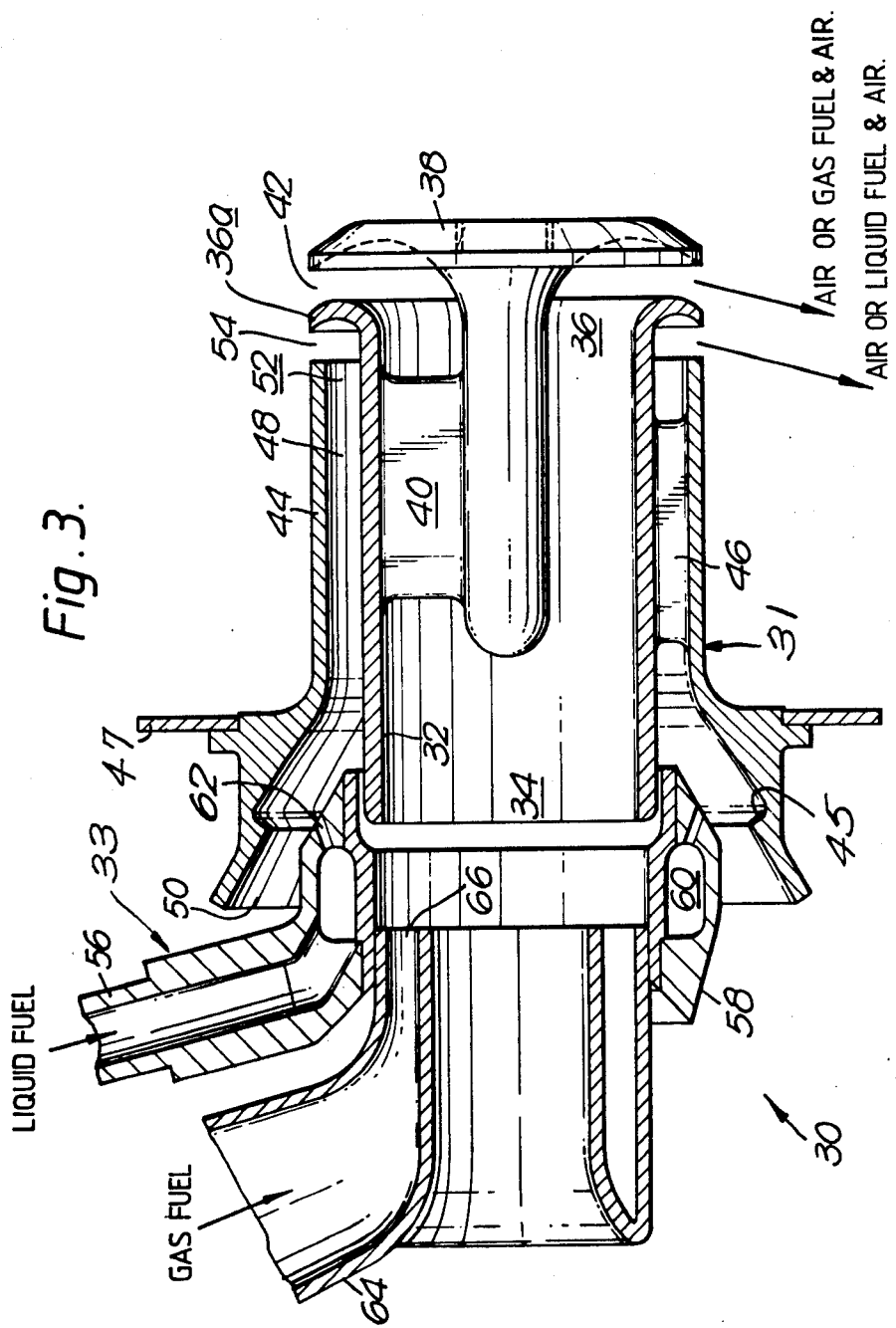

FUEL INJECTOR FOR GAS TURBINE ENGINES

The present invention relates to fuel injectors for gas turbine engines and is more particularly concerned with fuel injectors which are capable of injecting both liquid and gaseous fuels, for use in industrial gas turbines. The invention of the present application is based on the type of fuel injector described in U.K. Pat. No. 1,427,146, which comprises a central duct arranged to receive a flow of compressed air and a flow of fuel, a deflecting member located adjacent the downstream end of the duct, which with the end of the duct forms an annular outlet for the outflow of the fuel and air mixture in a generally radial direction, and a shroud surrounding part of the central duct forming an annular duct which is arranged to receive a flow of air at its upstream end and to discharge the air from its downstream end, which is located upstream of the annular outlet from the central duct. This type of fuel injector in conjunction with the combustion chamber in which it is located, is intended to produce two adjacent opposite handed toroidal vortices. A majority of the fuel/air mixture flows into the upstream vortex where it is ignited, and the burning fuel/air mixture flows into the downstream which is partly fed by the flow from the fuel injector and partly by secondary air flowing into the combustion chamber. It is important that the air/fuel ratio in each vortex is maintained within a certain range for the various engine operating conditions. In particular, the upstream vortex should tend to be fuel rich, but under certain conditions it has been found that the upstream vortex is less fuel rich than is desirable and the downstream vortex is less fuel weak than is desirable, indicating a migration or a disproportionate distribution of fuel from the injector into the two vortices.

It is an aim of the present invention to provide a fuel injector of the type described in which the air/fuel ratio in the upstream vortex can be maintained at or above a certain minimum level so as to keep NOx emissions at an acceptable level. It is also an aim of the present invention to provide a fuel injector of the type described which is capable of operating on both liquid and gaseous fuels having a wide range of calorific values.

It is a further aim of the present invention to provide a fuel injector of the type described arranged to reduce the deposition of carbon on the deflecting member.

Accordingly, the present invention provides a dual fuel injector for a gas turbine engine, the fuel injector comprising a passageway assembly including a central duct having open upstream and downstream ends, a deflecting member located adjacent the downstream end of the central duct, the deflecting member and the said downstream end together forming an annular generally radially directed outlet, a shroud member at least partially surrounding the central duct to form an annular duct having open upstream and downstream ends, the downstream end having an annular, generally radially directed outlet, the central duct and the annular duct both being arranged to receive a supply of compressed air from the compressor of the engine. The dual fuel injector further includes a fuel injector assembly including an inner fuel ducting arranged to supply a flow of fuel to the central duct and an outer fuel ducting arranged to supply a flow of fuel to the annular duct.

In a preferred arrangement, the inner fuel ducting is arranged to supply a flow of gaseous fuel and the outer fuel ducting is arranged to supply a flow of liquid fuel to the annular duct. With this arrangement and operating on liquid fuel, a mixture of fuel and air will issue in a generally radial direction from the outlet at the downstream end of the annular duct and a flow of air will issue in a generally radial direction from the annular outlet of the central duct. This flow of air tends to keep the liquid fuel in the most upstream toroidal vortex thereby tending to maintain the air/fuel ratio in that vortex at the desired value. The radial flow of air also tends to prevent the deposition of carbon on the deflecting member.

The inner and outer fuel ducting may be separate from the central and annular ducts and the deflecting member, so that the fuel ducting of the fuel injector assembly is attached to the engine casing and the remainder of the fuel injector, namely, the passageway assembly is attached to the head of flame tube. Such arrangement allows the size of the opening for the fuel ducting of the fuel injector assembly on the engine casing to be reduced, as no account need be taken of the central and annular ducts and the deflecting member.

The present invention will now be more particularly described with reference to the accompanying drawings in which:

FIG. 1 shows a gas turbine engine incorporating one form of fuel injector according to the present invention.

FIG. 2 illustrates diagrammatically to a larger scale a part of one of the flame tubes of the engine shown in FIG. 1 and the fuel injector.

FIG. 3 shows the fuel injector illustrated in FIG. 2 to a larger scale.

Referring to the figures; a gas turbine engine 10 comprises a low pressure compressor 12, a high pressure compressor 14, a low pressure turbine 16 driving the compressor 12 and a high pressure turbine 18 driving the compressor 14. A portion of the delivery air from the compressor 12 flows through a by-pass duct 20 and mixes with the exhaust from the turbine 18 to be exhausted from the engine through a nozzle 22. The exhaust gases are then used to drive a power turbine (not shown) which in turn drives a load, such as an electrical generator or a pump.

The combustion equipment 24 of the engine comprises a number of equal-spaced flame tubes 26 located in an annular casing 28, each flame having a fuel injector (FIGS. 2 and 3).

Since the engine is intended for industrial use, it is designed to be capable of operating on both liquid and gaseous fuels.

Referring to FIGS. 2 and 3, the fuel injector 30 includes a passageway assembly 31 having a central duct 32 having open upstream and downstream ends 34, 36 respectively. A deflecting member 38 is located at the downstream end 36 of the duct 32 and is supported from the duct by one or more arms 40. The deflecting member 38 together with the downstream end 36 which has a lip 36a forms an annular outlet 42 arranged so that air or fuel and air mixture issuing from the outlet, flows in a generally radial direction towards the circumferential wall of the flame tube 26.

The central duct 32 is attached to a shroud 44 by one or more arms 46, the shroud being attached to the head 47 of the flame tube 26. The shroud at least partially surrounds the central duct to form an annular duct 48 for the passageway assembly 31 having open upstream and downstream ends 50, 52 respectively. The downstream end 52 together with the lip 36a of the central duct form an annular outlet 54 for air or a fuel and air mixture to flow in a generally radial direction towards the circumferential wall of the flame tube 26.

The flame tube 26 includes a cooling ring 68 of conventional construction having apertures which allows cooling air to flow in both upstream and downstream directions, and secondary air inlets 70. The fuel injector 30 and the flame tube 26 operate on a similar basic principle to the arrangement described in U.K. Pat. No. 1,427,146 in that two toroidal vortices 72, 74 of opposite hand are formed in the flame tube. The upstream end of the shroud 44 is flared and has a downstream facing shoulder 45 (FIG. 3), from which any liquid fuel which tends to flow in an upstream direction can be detached by the flow of compressed air.

The fuel injector 30 further includes a fuel injector assembly 33 comprising outer liquid fuel supply ducting 56 having an annular manifold 60 communicating with a plurality of liquid fuel outlets 62, and an inner gaseous fuel supply ducting 64 terminating in an annular gaseous fuel outlet 66. The liquid fuel outlets 62 of the outer liquid fuel ducting 56 inject liquid fuel into the annular duct 48 adjacent to the upstream end 50 thereof whereas the annular gaseous fuel outlet 66 of the inner fuel ducting is aligned with and arranged to discharge gaseous fuel into the upstream end of central duct 32.

The fuel injector assembly 33 made up of the outer fuel ducting 56 and the inner fuel ducting 64 is independent and separate from the passageway assembly 31 made up of this central duct 32, annular duct 48 and the deflecting member 38. The fuel injector assembly 33 is attached to the casing 28. This arrangement allows the size of the opening in the casing 28 to be smaller than if the fuel injector assembly 33 was attached directly to the passageway assembly 31 as no accounting need be taken for the size of the passageway assembly 31 since the assembly 31 does not have to be removed when there is removal of the fuel injector assembly 33.

When the fuel injector 30 is operating on liquid fuel, a liquid fuel and air mixture flows through the annular duct 48 and is injected into the flame tube in a generally radial direction towards the wall of the flame tube, and becomes part of the upstream vortex 72 which is also fed by air from the cooling ring 68. At the same time a flow of compressed air passes through the central duct 32 and through the outlet 42 also in a generally radial direction towards the flame tube wall and separates the two vortices from each other.

The air fuel ratio (AFR) in the upstream vortex is arranged to be fuel rich with an AFR in the range 6/1 to 10/1 but preferably 7/1 or 8/1, in order to keep the emissions of NOx to an acceptable level. The fuel is burnt in the upstream vortex and the products of combustion which may contain unburnt or partially burnt fuel passes into the downstream vortex which is fed with secondary air, and is fuel weak with an AFR in the range 22/1 to 28/1, but preferably around 25/1. The flow of compressed air from the outlet 42 tends to keep the fuel in the upstream vortex to maintain the desired AFR in this region, as opposed to the possibility of some fuel migrating to the downstream vortex, thereby weakening the upstream vortex and richening the downstream vortex, which would promote rather than lessen the emissions of NOx.

Also, the flow of air from outlet 42 tends to prevent the deposition of carbon onto the deflecting member because this flow tends to keep the products of combustion away from the deflecting member. It is important that carbon deposition is minimised because if carbon is allowed to deposit in sufficient quantity, it will ultimately breakaway in pieces and damage downstream components of the engine.

When operating on gaseous fuel, the fuel flows into the duct 32 along with the compressed air and the mixture flows into the flame tube through the outlet 42, while a flow of compressed air flows into the flame tube through the annular duct 48 and the outlet 54. This latter flow of air enhances the vortex 72, but in the case of gaseous fuels, the placement and distribution of the fuel into the vortices is not so critical as with liquid fuels in relation to the production of NOx. Also, no specific measures are necessary with gaseous fuels in regard to the deposition of carbon, since in general such fuels burn clean and do not produce significant amounts of free carbon.

We claim:

1. A dual fuel injector for a gas turbine engine having a casing with a compressor, combustor means capable of promoting therein a first upstream toroidal vortex and a second downstream toroidal vortex, and a turbine arranged in flow series within the casing, said fuel injector comprising:

a passageway assembly attached to said combustor means, said passageway assembly including a central duct having open upstream and downstream ends, a first deflecting member positioned downstream of said downstream end of said central duct and forming therewith a first annular generally radially directed outlet, a shroud member extending at least partially along the length of said central duct and forming therewith an annular duct concentric of said central duct, said annular duct having open upstream and downstream ends, a second deflecting member carried on the downstream end of said central duct and spaced downstream of said downstream end of the shroud member and forming therewith a second annular generally radially directed outlet upstream of said first outlet;

a supply of compressed air from said compressor for continuous delivery to said central duct and to said annular duct; and a fuel injector assembly attached to said casing, said fuel injector assembly being detachably arranged with respect to and cooperating with said passageway assembly for selectively providing liquid fuel and gaseous fuel thereto, said fuel injector assembly including inner fuel ducting for gaseous fuel and outer fuel ducting for liquid fuel, said inner fuel ducting terminating in an annular outlet upstream of and aligned with said upstream end of said central duct for supplying gaseous fuel thereto for mixing with compressed air therein to be discharged as an air/gaseous fuel mixture radially through said first outlet while compressed air only is discharged from said second outlet, and said outer fuel ducting including a liquid fuel manifold having a plurality of liquid fuel outlets communicating with said annular duct adjacent to said upstream end thereof for supplying liquid fuel thereto for mixing with compressed air therein to be discharged as an air/liquid fuel mixture through said second outlet into said first toroidal vortex while compressed air only is discharged radially through said first outlet thereby tending to maintain said air/liquid fuel mixture upstream thereof in said first toroidal vortex and to prevent deposition of carbon on said first deflecting member.

2. A dual fuel injector as claimed in claim 1 in which the shroud has a flared upstream end, the flare including a shoulder arranged to catch any liquid fuel tending to flow in an upstream direction.

* * * * *